United States Patent
Zhang et al.

(10) Patent No.: US 10,981,345 B2
(45) Date of Patent: Apr. 20, 2021

(54) METHOD AND APPARATUS FOR CLEANING WORKPIECE, AND METHOD AND APPARATUS FOR CLEANING (PORE-FREE) TIRE SEGMENT MOLD

(71) Applicant: HIMILE MECHANICAL SCIENCE AND TECHNOLOGY (SHANDONG) CO., LTD, Shandong (CN)

(72) Inventors: Ren Zhang, Shandong (CN); Haibo Ma, Shandong (CN); Jungang Xue, Shandong (CN); Wei Zhang, Shandong (CN); Xiaodong Wang, Shandong (CN); Jiqiang Shan, Shandong (CN)

(73) Assignee: HIMILE MECHANICAL SCIENCE AND TECHNOLOGY (SHANDONG) CO., LTD, Shandong (CN)

( * ) Notice: Subject to any disclaimer, the term of this patent is extended or adjusted under 35 U.S.C. 154(b) by 598 days.

(21) Appl. No.: 15/440,502

(22) Filed: Feb. 23, 2017

(65) Prior Publication Data

US 2018/0236739 A1     Aug. 23, 2018

(51) Int. Cl.
*B29D 30/06* (2006.01)
*B08B 3/10* (2006.01)
(Continued)

(52) U.S. Cl.
CPC ............ *B29D 30/0662* (2013.01); *B08B 3/10* (2013.01); *B08B 7/0071* (2013.01); *B29C 33/72* (2013.01);
(Continued)

(58) Field of Classification Search
CPC ........ B29D 30/0662; B29D 2030/0663; B08B 3/10; B08B 7/0071; B08B 3/106; B29C 33/72
See application file for complete search history.

(56) References Cited

U.S. PATENT DOCUMENTS 2,654,911 A * 10/1953 Sharlip .................. A61C 13/20
                                                        118/685
4,145,326 A *  3/1979 Blackwell ............ C09D 181/02
                                                        427/385.5
(Continued)

FOREIGN PATENT DOCUMENTS

CN        102242020 A      11/2011
CN        102586794 A       7/2012
(Continued)

OTHER PUBLICATIONS

Translation CN 105382978.*
(Continued)

*Primary Examiner* — Alexander Markoff
(74) *Attorney, Agent, or Firm* — Renner, Otto, Boisselle & Sklar, LLP

(57) ABSTRACT

The present disclosure provides a method and apparatus for cleaning a workpiece, and a method and apparatus for cleaning a ventless tire segment mold. The method for cleaning a workpiece comprises: heating the workpiece to a preset temperature; and applying a cleaning solution onto the workpiece so that the cleaning solution is vaporized instantaneously to form a micro-explosion at each shocking point, thereby peeling dirt off the workpiece and achieving the purpose of workpiece cleaning. The apparatus for cleaning a workpiece comprises: a heating device for heating the workpiece into a preset temperature range, and a cleaning device for applying a cleaning solution onto the workpiece so that the cleaning solution is vaporized instantaneously to form a micro-explosion at each shocking point, thereby peeling dirt off the workpiece and achieving the purpose of workpiece cleaning. The present disclosure not only cleans the dirt on the surface of the workpiece, but also makes a significant breakthrough in the cleaning of the gaps of
(Continued)

micron or nano scale on the workpiece. The present disclosure has the characteristics of lower cost, simple cleaning, thorough dirt removal, etc.

9 Claims, 8 Drawing Sheets

(51) Int. Cl.
  *B29C 33/72* (2006.01)
  *B08B 7/00* (2006.01)
(52) U.S. Cl.
  CPC ...... *B08B 3/106* (2013.01); *B29D 2030/0663* (2013.01)

(56) References Cited

U.S. PATENT DOCUMENTS

| | | | | |
|---|---|---|---|---|
| 4,564,737 | A | * | 1/1986 | Burke ............... B23K 26/0823 219/121.68 |
| 5,393,816 | A | * | 2/1995 | Kondo ................. B29C 33/722 524/247 |
| 5,441,573 | A | * | 8/1995 | Kondo ................. B29C 33/722 134/8 |
| 5,556,572 | A | * | 9/1996 | Nishinaka ............ B29C 33/722 134/18 |
| 5,585,064 | A | * | 12/1996 | Moris-Herbeuval ........................ B29C 33/0038 264/501 |
| 5,643,367 | A | * | 7/1997 | Viel ..................... B08B 7/0042 134/1 |
| 5,669,979 | A | * | 9/1997 | Elliott .................. B08B 7/0042 134/1 |
| 5,769,953 | A | * | 6/1998 | Yoshikawa .......... B08B 7/0035 134/1.1 |
| 5,855,728 | A | * | 1/1999 | Saitoh .................. B08B 7/0035 156/345.41 |
| 6,369,353 | B1 | * | 4/2002 | Soska .................. B08B 7/0042 219/121.68 |
| 2003/0091671 | A1 | * | 5/2003 | Serener-Thielmann ..................... B29C 33/10 425/28.1 |
| 2006/0134250 | A1 | * | 6/2006 | Henrotte ............ B29D 30/0629 425/35 |
| 2007/0009623 | A1 | * | 1/2007 | Lahr .................. B29D 30/0629 425/35 |
| 2008/0088057 | A1 | * | 4/2008 | Henrotte ............ B29D 30/0629 264/219 |
| 2009/0032055 | A1 | | 2/2009 | Seko et al. |
| 2011/0298157 | A1 | * | 12/2011 | Vossen ............... B29D 30/0662 264/402 |
| 2013/0341814 | A1 | * | 12/2013 | Witz ................... B29C 45/1753 264/39 |
| 2015/0086664 | A1 | * | 3/2015 | Zhang ..................... B29C 33/10 425/28.1 |
| 2015/0140835 | A1 | * | 5/2015 | Tateno ................... C23C 16/52 438/773 |
| 2015/0165706 | A1 | * | 6/2015 | Gaebelein .......... B29D 30/0629 264/293 |
| 2017/0073879 | A1 | * | 3/2017 | Katsumata ............... F28D 7/024 |

FOREIGN PATENT DOCUMENTS

| | | | |
|---|---|---|---|
| CN | 102601897 A | | 7/2012 |
| CN | 105382978 A | * | 3/2016 |
| JP | 2002115966 A | * | 4/2002 |
| WO | WO-2016002811 A1 | * | 1/2016 ........... D06F 43/088 |

OTHER PUBLICATIONS

Description of JP 2002115966.*
The Fourth Office action in CN 201510526093.*
Office Action dated Nov. 30, 2018 for counterpart Chinese patent application No. 201510526093.6, along with English machine translation.
Fourth Office Action dated May 31, 2019 for counterpart Chinese patent application No. 201510526093.6, along with Enligsh machine translation.
First Office Action and Search Report dated Jan. 17, 2018 in counterpart Chinese Patent Application No. 201510526093.6, along with English machine translation downloaded from EPO.
Second Office Action and Search Report dated Jun. 29, 2018 in counterpart Chinese Patent Application No. 201510526093.6, along with English machine translation downloaded from EPO.
Zhagn Jincheng, "Cleaning Technology and Application of Pig", Petroleum Industry Publishing House, Feb. 20, 2005.

* cited by examiner

METHOD AND APPARATUS FOR CLEANING WORKPIECE, AND METHOD AND APPARATUS FOR CLEANING (PORE-FREE) TIRE SEGMENT MOLD

TECHNICAL FIELD

The present disclosure relates to a cleaning technique applied in the field of workpiece cleaning, and particularly, to a method and apparatus for cleaning a workpiece, and a method and apparatus for cleaning ventless tire segment molds.

BACKGROUND ART

Currently, the cleaning methods used by some industrial and mining enterprises in China mainly are chemical cleaning, mechanical cleaning, high pressure water cleaning, dry ice cleaning, laser cleaning, etc.

Chemical cleaning includes organic solvent cleaning, melting method, acid washing, alkali washing, etc. The workpiece will be corroded when above methods are used for a longer time, which directly affects the appearance and quality of the product, and the environment will also be polluted to a certain extent.

Mechanical cleaning includes manual grinding, sand grinding, etc., and avoids the chemical corrosion. But after multiple grindings and cleanings, the workpiece precision will be decreased, and a dust pollution will be caused.

High pressure water cleaning is a process to flush the surface of an object using high pressure water generated by a high pressure plunger pump driven by a power unit, so as to peel and wash away the dirt. But if the pressure is too low, the cleaning will not be thorough and complete, and if the pressure is too high, the workpiece will be damaged and the operator's labor intensity and security risk will be increased.

Dry ice cleaning is a process in which dry ice particles are accelerated in the high pressure airflow to shock a surface to be cleaned; the dry ice particles are gasified at the moment of shocking, and a thermal shock occurs due to the temperature difference between the dry ice particles and the surface to be cleaned; the material has its temperature decreased while the brittleness increased, and the dry ice particles can break the dirt layer by shocking. But as a solid carbon dioxide, dry ice has a poor fluidity, thus the cleaning effect on the corners of the workpiece is not ideal, and particularly, the inner cavity of the workpiece can hardly be cleaned.

Laser cleaning utilizes the difference between an absorption coefficient of the base material of the workpiece and an absorption coefficient of dirt attached to the surface of the workpiece with respect to laser energy of a certain frequency, so that the dirt attached to the surface absorb the laser energy sufficiently, thus being expanded under heat until gasified, so as to achieve the purpose of cleaning. The laser cleaning is efficient and environment friendly. But due to the energy attenuation or being untouchable, tiny gaps and the inner cavity of the workpiece almost cannot be cleaned, while the cleaning cost is high and the cleaned surface of the workpiece has a chromatic aberration.

All of those cleaning manners have a certain cleaning effect on the surface of the workpiece, with their own advantages and disadvantages. However, the cleaning effect on tiny apertures, grooves and gaps of the workpiece is not good, and particularly, there is no obvious cleaning effect on those below the millimeter scale (e.g., micron or nano scale).

SUMMARY OF THE DISCLOSURE

An objective of the present disclosure is to provide a method and apparatus for cleaning a workpiece, which not only clean dirt on a surface of the workpiece, but also makes a significant breakthrough in the cleaning of the gaps of micron or nano scale on the workpiece. The present disclosure has the characteristics of lower cost, simple cleaning, thorough dirt removal, etc.

Another objective of the present disclosure is to provide a method and apparatus for cleaning a ventless tire segment mold, which not only cleans dirt on a surface of the ventless tire segment mold, but also makes a significant breakthrough in the cleaning of the gaps of micron or nano scale on the ventless tire segment mold. The present disclosure has the characteristics of lower cost, simple cleaning, thorough dirt removal, etc.

The above objectives of the present disclosure can be achieved by employing the following technical solutions:

The present disclosure provides a method for cleaning a workpiece, comprising:

heating the workpiece to a preset temperature; and applying a cleaning solution onto the workpiece so that the cleaning solution is vaporized instantaneously to form a micro-explosion at each shocking point, thereby peeling dirt off the workpiece and achieving the purpose of workpiece cleaning.

In one embodiment of the present disclosure, the cleaning solution is applied onto the workpiece in a manner of spraying, and the cleaning solution is a water-based solution.

In one embodiment of the present disclosure, the temperature is 100° C. to 600° C.

In one embodiment of the present disclosure, the temperature is 200° C. to 500° C.

In one embodiment of the present disclosure, the temperature is 300° C. or 350° C. or 400° C.

In one embodiment of the present disclosure, the cleaning solution is a corrosion-resistant and rust-resistant water-based organic solution; or the cleaning solution is water.

In one embodiment of the present disclosure, if there is a cavity in the workpiece, the cleaning is made from the inside to the outside of the cavity and the workpiece is in a non-sealed state.

In one embodiment of the present disclosure, the heating furnace is filled with inert gas such as argon before the heating, for a purpose of protecting the workpiece from being oxidized.

In one embodiment of the present disclosure, the workpiece is put into a sealed structure firstly, and after the sealed structure is vacuumized, the workpiece is vacuum-heated.

In one embodiment of the present disclosure, an oxidation protection processing is performed on a surface of the workpiece before the heating.

In one embodiment of the present disclosure, the workpiece is a ventless tire segment mold.

In one embodiment of the present disclosure, the method further comprises cleaning an outer surface of the workpiece by using dry ice or laser.

The present disclosure further provides an apparatus for cleaning a workpiece, comprising a heating device for heating the workpiece to a preset temperature range, and a cleaning device for applying a cleaning solution onto the workpiece so that the cleaning solution is vaporized instantaneously to form a micro-explosion at each shocking point, thereby peeling dirt off the workpiece and achieving the purpose of workpiece cleaning.

In one embodiment of the present disclosure, the heating device comprises a heating furnace, below which a slide rail is disposed; a carrier vehicle is movably disposed on the slide rail; and the workpiece is placed on the carrier vehicle.

In one embodiment of the present disclosure, the heating device comprises a sealable structure, which is formed by a furnace chamber of the heating furnace and two furnace doors hermetically disposed at an inlet end and an outlet end of the furnace chamber, respectively; the apparatus for cleaning the workpiece further comprises a vacuum device capable of vacuumizing the heating device; and after the furnace chamber is vacuumized by the vacuum device, the workpiece is vacuum-heated.

In one embodiment of the present disclosure, the apparatus for cleaning the workpiece further comprises a temperature control device connected to the heating device and controlling the heating device to heat the workpiece to and maintain the preset temperature range.

In one embodiment of the present disclosure, the heating device and the temperature control device are disposed separately from the cleaning device; the apparatus for cleaning the workpiece further comprises a transporting device for transporting the heated workpiece to the cleaning device for a cleaning.

In one embodiment of the present disclosure, the transporting device comprises a transporting slide rail; the apparatus for cleaning the workpiece comprises an outer frame having the heating device located at one end and the cleaning device located at the other end; the transporting slide rail is connected to a top of the outer frame and located between the heating device and the cleaning device; and a transporting tray is movably connected to the transporting slide rail.

In one embodiment of the present disclosure, the apparatus for cleaning the workpiece further comprises a thermal insulation wall disposed along the transporting device, so as to maintain the temperature of the workpiece in the transporting process and protect operating personnel.

In one embodiment of the present disclosure, the cleaning device comprises a water tank, a pumping device, a hydraulic tank and a spray thrower; the pumping device transfers the cleaning solution from the water tank to the spray thrower, and the hydraulic tank controls and realizes various cleaning actions.

In one embodiment of the present disclosure, the cleaning device further comprises a cleaning chamber into which the spray thrower is movably connected; the cleaning chamber is further provided therein with a tray for placing the workpiece.

In one embodiment of the present disclosure, the spray thrower comprises two sprayers disposed as being opposite to each other, which are connected to a water pipe connector, respectively, and the water pipe connectors are connected to the pumping device.

In one embodiment of the present disclosure, the cleaning device further comprises a filter for filtering the cleaning solution, so as to meet a cleaning requirement.

In one embodiment of the present disclosure, the apparatus for cleaning the workpiece further comprises an electric cabinet for transmitting electricity to the entire apparatus.

In one embodiment of the present disclosure, the cleaning solution is a water-based solution or water.

In one embodiment of the present disclosure, the water-based solution is a corrosion-resistant and rust-resistant water-based organic solution.

In one embodiment of the present disclosure, the apparatus for cleaning the workpiece further comprises an oxidation protection device for performing an oxidation protection processing on a surface of the workpiece before the heating, and then the workpiece is put into the heating device.

In one embodiment of the present disclosure, the workpiece is a ventless tire segment mold.

The present disclosure further provides a method for cleaning a ventless tire segment mold having upper and lower holes for injecting a cleaning solution, wherein the cleaning solution is injected into the ventless tire segment mold from the upper and lower holes thereof; the cleaning solution is instantaneously vaporized to form a micro-explosion at each shocking point of an inner cavity of the ventless tire segment mold, thereby peeling dirt off the ventless tire segment mold, and the dirt flows out from gaps of the ventless tire segment mold, so that the ventless tire segment mold is cleaned The present disclosure further provides an apparatus for cleaning a ventless tire segment mold, comprising the aforementioned apparatus for cleaning a workpiece to clean the ventless tire segment mold.

The method and apparatus for cleaning the workpiece, and the method and apparatus for cleaning the ventless tire segment mold in the present disclosure have the characteristics and advantages that the present disclosure employs the method and apparatus that clean a workpiece using a cleaning solution in a high temperature; firstly, the workpiece is heated to a certain high temperature, then the cleaning solution is sprayed onto the workpiece to complete the cleaning; when being sprayed onto the workpiece in a high temperature, the cleaning solution will be quickly sublimated into gas, i.e., vaporized instantaneously, to form a "micro-explosions" at each shocking point, thereby peeling dirt off the workpiece and completing cleaning.

The present disclosure not only cleans the dirt on the surface of the workpiece, but also makes a significant breakthrough in the cleaning of the gaps of micron or nano scale on the workpiece. The present disclosure has the characteristics of lower cost, simple cleaning, thorough dirt removal, etc.

BRIEF DESCRIPTION OF THE DRAWINGS

In order to describe the technical solutions more clearly in the embodiments of the present disclosure, the figures to be used in the descriptions of the embodiments will be briefly introduced as follows. Obviously, the following figures just illustrate some embodiments of the present disclosure, and a person skilled in the art can obtain other figures/drawings from them without paying any creative effort.

DETAILED DESCRIPTION OF THE PREFERRED EMBODIMENTS

The technical solutions in the embodiments of the present disclosure will be clearly and completely described as follows in conjunction with the figures of the embodiments of the present disclosure. Obviously, those described are just a part, rather than all, of the embodiments of the present disclosure. Based on those embodiments of the present disclosure, any other embodiment obtained by a person skilled in the art without paying any creative effort shall fall within the protection scope of the present disclosure.

Embodiment 1

Figure 1:
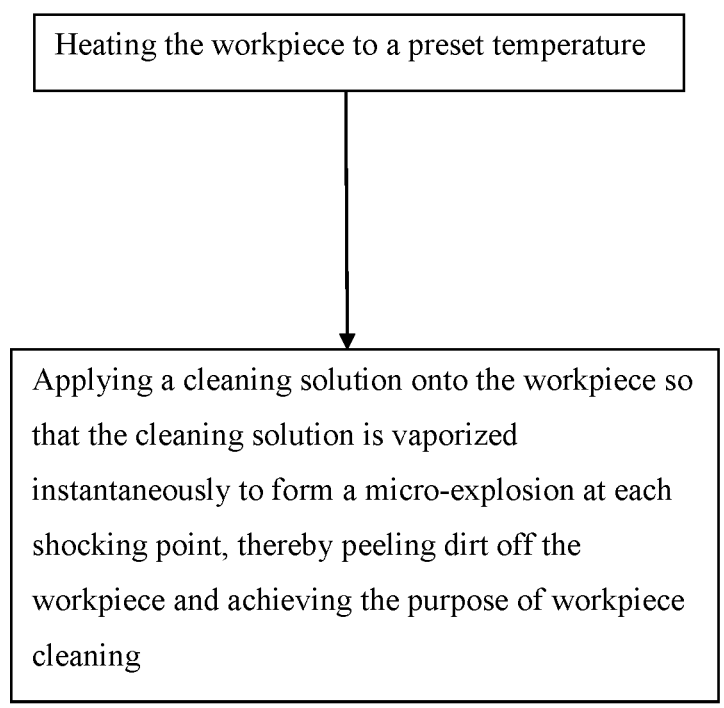
FIG. 1 is a flowchart of the method for cleaning a workpiece in the present disclosure.

As illustrated in FIG. 1, the present disclosure provides a method for cleaning a workpiece, comprising:

a) heating the workpiece to a preset temperature; and b) applying a cleaning solution onto the workpiece so that the cleaning solution is vaporized instantaneously to form a micro-explosion at each shocking point, thereby peeling dirt off the workpiece and achieving the purpose of workpiece cleaning.

Specifically, in step a), the workpiece is heated to a preset temperature such as 100° C. to 600° C., and preferably 200° C. to 500° C.; further more, the preset temperature is 300° C., or 350° C. or 400° C. in the present disclosure; the preset temperature is defined based on the material of the workpiece and the working condition, without causing deformation and influencing precision of the workpiece, which is not limited herein. Step a) preheats the workpiece, so that the workpiece reaches the spraying requirement of step b).

In the present disclosure, step a1) is needed before step a): firstly putting the workpiece into a sealed structure, vacuumizing the sealed structure with a vacuum device, and vacuum-heating the workpiece. Alternatively, in other embodiment, step a1) may perform an oxidation protection processing on the surface of workpiece before heating, so as to form an oxidation film layer on the surface of the workpiece.

Step a1) of the present disclosure employs a vacuum-heating or performs an oxidation protection processing on the surface of workpiece in advance, which is designed to avoid oxidation of the surface of the workpiece that might be caused by heating the workpiece, when the workpiece to be cleaned has a high precision requirement. In addition, in other embodiments, a heating furnace 11 may be filled with inert gas such as argon before heating, for the purpose of protecting the workpiece from being oxidized.

In step b), the cleaning solution applied onto the workpiece may be a water-based solution; what's more, the water-based solution is a corrosion-resistant and rust-resistant water-based organic solution. Alternatively, in other embodiment, the cleaning solution applied onto the workpiece is water, or using gas like nitrogen or argon in low temperature as cleaning medium. In which, the water-based organic solution is environmentally friendly and can be recycled or directly evacuated. Further more, the cleaning solution is applied onto the workpiece in the manner of spraying. In the present disclosure, the spraying has the meaning of injection, dripping leaching and/or scouring. When being sprayed onto the workpiece in a high temperature, the cleaning solution will be quickly sublimated into gas, i.e., vaporized instantaneously, to form a "micro-explosions" at each shocking point on the workpiece, thereby dirt is peeled off the workpiece and cleaning is completed. During the cleaning, there is no secondary waste generated in the whole process since the cleaning solution is volatilized, and only the peeled dirt is left to be collected and cleaned.

Comparison between the method for cleaning the workpiece in the present disclosure and the dry ice cleaning method: the dry ice is a solid and its fluidity is poor, thus the tiny apertures, grooves and gaps almost cannot be cleaned. While in the method of the present disclosure, the spraying medium is a cleaning solution and its fluidity is strong, thus the apertures, grooves and gaps can be full of the cleaning solution in a very short time, and the cleaning can be done by virtue of the "micro-explosion" and the liquid scouring force. As a result, the workpiece is very clean and the cleaning effect is ideal.

In one embodiment of the present disclosure, when the spraying is performed in step b), if there is a cavity in the workpiece, the cleaning is made from the inside to the outside of the cavity, i.e., the cavity of the workpiece and the gaps therein are cleaned in an order from the cavity of the workpiece to the outer surface of the workpiece, and the cleaning effect is better. In addition, the workpiece is preferably in an open or semi-open state, i.e., the workpiece is in a non-sealed state.

Figure 2:
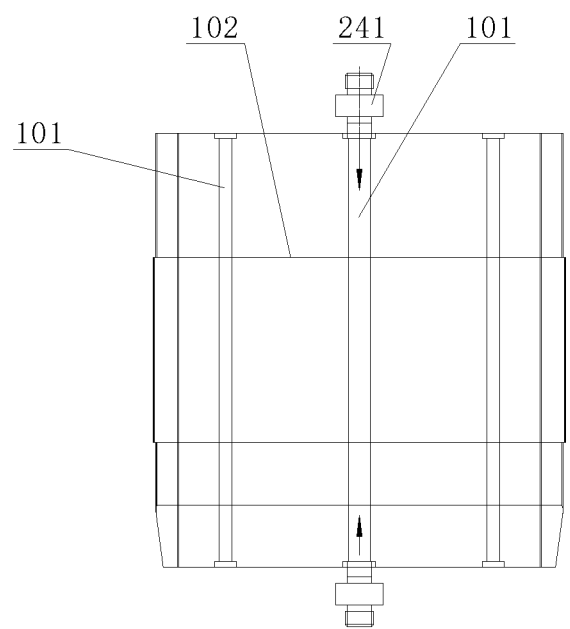
FIG. 2 is a front view of a ventless tire segment mold.
Figure 3:
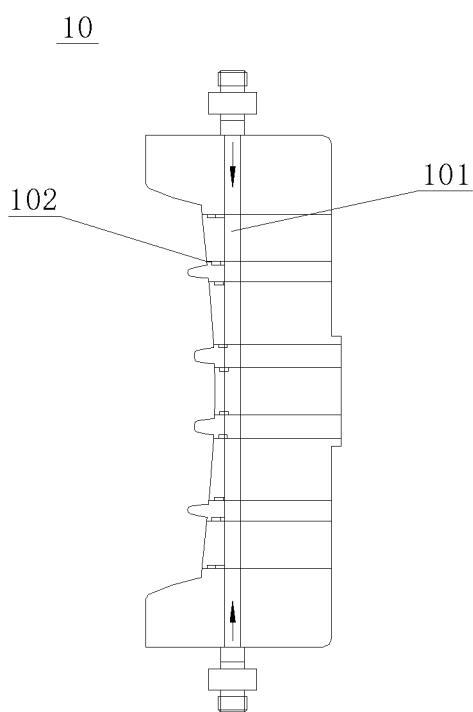
FIG. 3 is a side view of a ventless tire segment mold.

As illustrated in FIGS. 2 and 3, in a specific embodiment, the workpiece is a ventless tire segment mold 10, comprising a plurality of inner passages 101, and a plurality of gaps 102 communicated with the inner passages 101 and communicated to an outer surface of the venttless tire segment mold 10; the inner passage 101 and the gap 102 both have small cross sectional areas, usually in micron scale and even in nano scale; when the ventless tire segment mold 10 is cleaned through spraying, sprayers 241 are inserted into openings which are located at both ends of the ventless tire segment mold 10 and communicated with the inner passage 101; the cleaning solution is sprayed into the inner passage 101 and the gap 102 under a certain pressure; as liquid, the cleaning solution has strong fluidity, and can fill all of the inner passages 101 and gaps 102 in a very short time; under the effect of "micro-explosion" and the liquid scouring force, the dirt in the inner passages 101 and the gaps 102 of the ventless tire segment mold 10 can be cleaned; as a result, the dirt is peeled off the inner walls of the inner passages 101 and the gaps 102, and the workpiece becomes very clean. The ventless tire segment mold 10 is in an open or semi-open state during the cleaning, i.e., it has no sealed cavity, thereby avoiding any danger caused by the operation on the sealed cavity.

According to one embodiment of the present disclosure, the method for cleaning the workpiece further comprises: cleaning the outer surface of the workpiece by using dry ice or laser. After the inner cavity of the workpiece is cleaned with the cleaning solution, for instance in a feasible embodiment, the workpiece is the ventless tire segment mold 10; next, the outer surface of the workpiece is cleaned using dry ice or laser, so as to ensure the cleanness of the outer surface of the workpiece.

The method for cleaning the workpiece in the present disclosure achieves a good cleaning effect not only on the surface of the workpiece, but also on tiny apertures, grooves and gaps of the workpiece, and particularly has an obvious effect on the gaps, apertures and grooves below the millimeter scale (e.g., micron or nano scale). The cost is low, the cleaning is simple, and the dirt is removed thoroughly.

Embodiment 2

Figure 4:
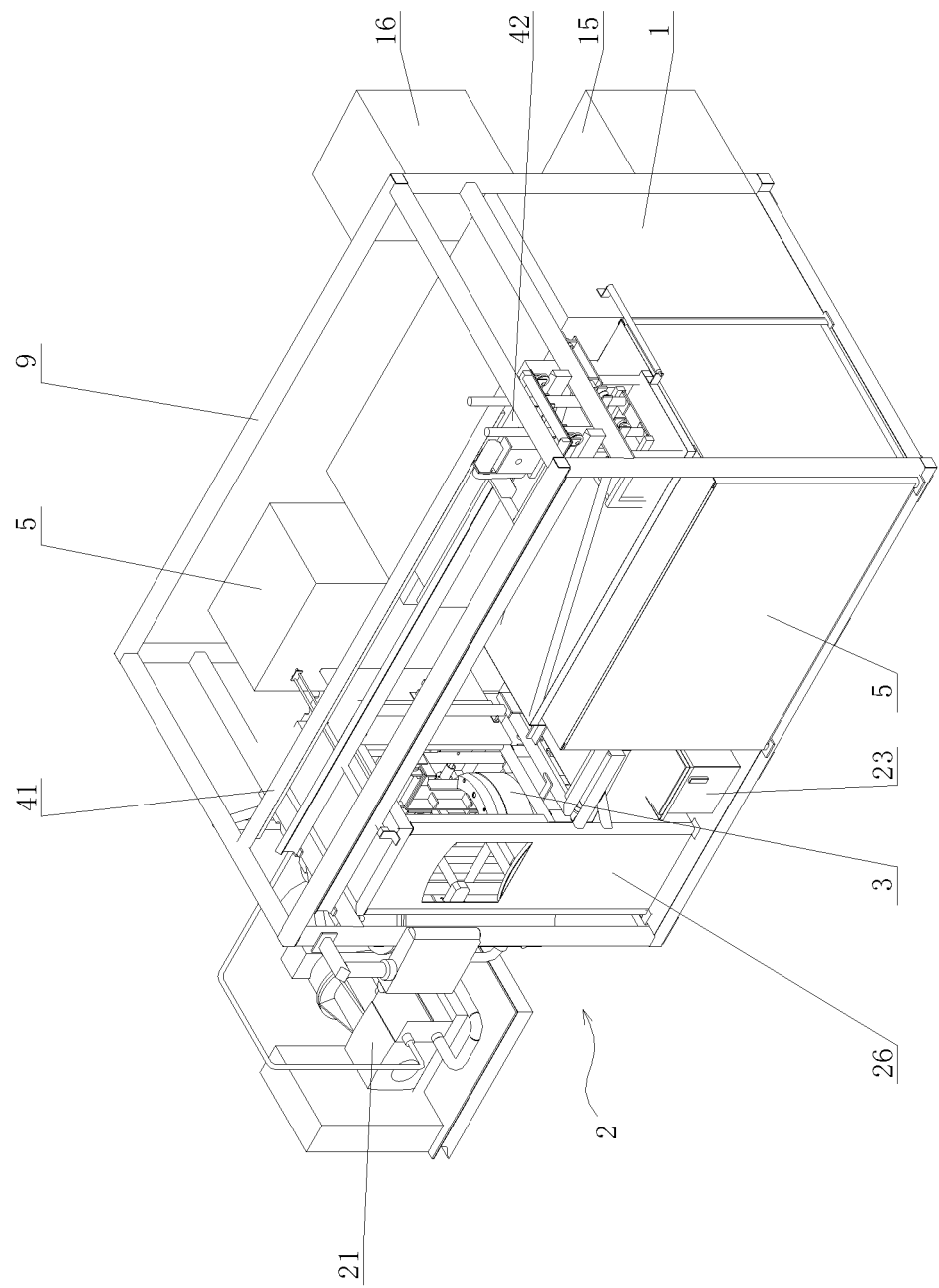
FIG. 4 is a structural diagram of an apparatus for cleaning a workpiece in the present disclosure.
Figure 5:
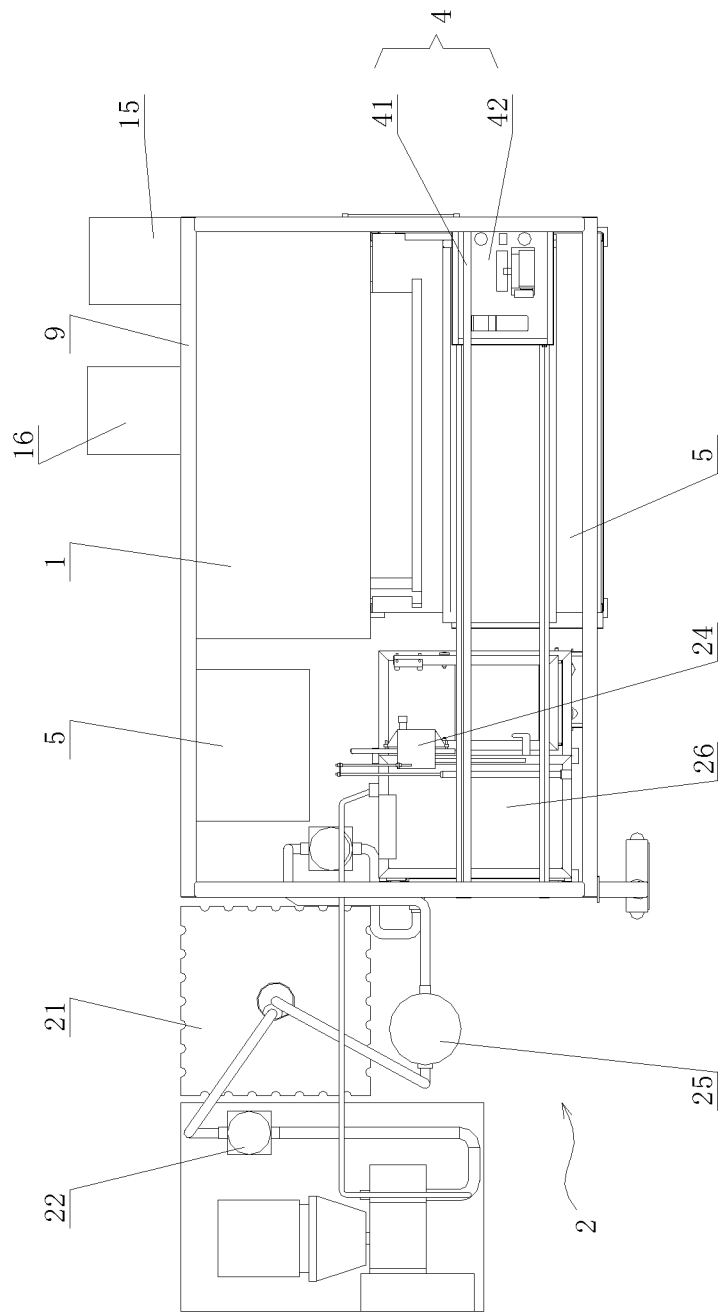
FIG. 5 is a top view of an apparatus for cleaning a workpiece in the present disclosure.

As illustrated in FIGS. 4 and 5, the present disclosure further provides an apparatus for cleaning a workpiece, comprising a heating device 1 for heating a workpiece 3 to a preset temperature range; and a cleaning device 2 for applying a cleaning solution onto the workpiece 3 so that the cleaning solution is vaporized instantaneously to form a micro-explosion at each shocking point, thereby peeling dirt off the workpiece and achieving the purpose of workpiece cleaning.

Specifically, the apparatus for cleaning the workpiece comprises an outer frame 9 that is substantially cuboid-shaped, having the heating device 1 located at one end and the cleaning device 2 located at the other end, wherein the heating device 1 and the cleaning device 2 are disposed as being opposite to each other along a diagonal line of the outer frame 9.

Figure 6:
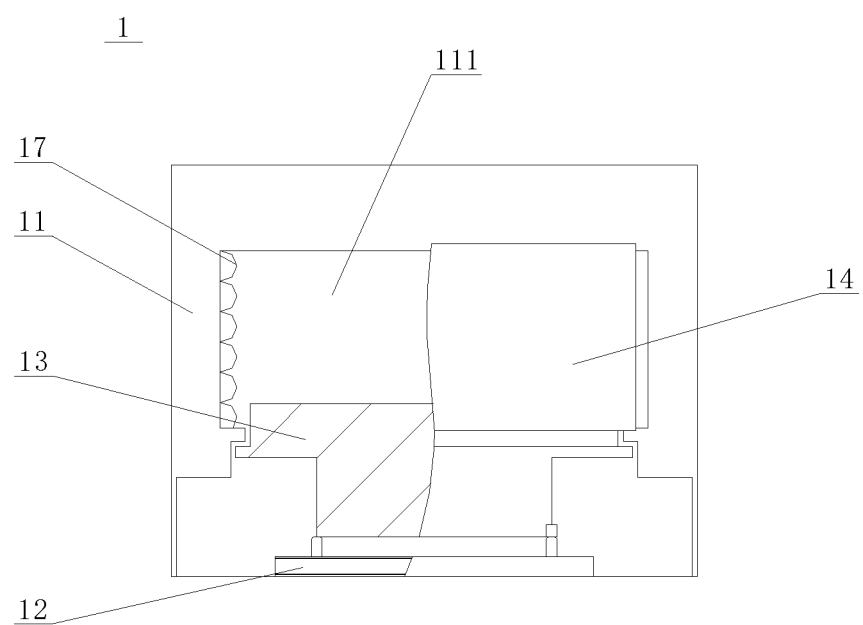
FIG. 6 is a structural diagram of a heating device of an apparatus for cleaning a workpiece in the present disclosure.

As illustrated in FIG. 6, the heating device 1 comprises a heating furnace 11, below which a slide rail 12 is disposed; a carrier vehicle 13 is movably disposed on the slide rail 12; and the workpiece 3 is placed on the carrier vehicle 13. The workpiece 3 is carried into the heating furnace 11 through the carrier vehicle 13, and the heating furnace 11 heats the workpiece 3 to a preset temperature range. In the present disclosure, the preset temperature is 100° C. to 600° C., and preferably 200° C. to 500° C. Further in this embodiment, the preset temperature is 300° C., or 350° C. or 400° C. The preset temperature is selected based on the material of the workpiece and the working condition, without causing deformation and influencing precision of the workpiece, which is not limited herein.

The heating furnace 11 comprises a furnace chamber 111, having an inlet end and an outlet end connected to a furnace door 14, respectively, thus the two furnace doors 14 and the furnace chamber 111 form a sealable structure. Further, the apparatus for cleaning the workpiece also comprises a vacuum device 15 capable of vacuumizing the heating device 1. The vacuum device 15 is connected to the heating furnace 11, and communicated with the sealable structure via pipelines. After the furnace chamber 111 is vacuumized by the vacuum device 15, the workpiece 3 is vacuum-heated after being carried into the furnace chamber 111 by the carrier vehicle 13.

The vacuum device 15 is known in the prior art, and its specific structure is omitted herein. In one embodiment, the vacuum device 15 for example may comprise a connection pipe having one end extending into the furnace chamber 111, and the other end connected to a vacuum pump. The vacuum device 15 of the present disclosure is designed to avoid the oxidation of the surface of the workpiece 3 that might be caused by heating the workpiece 3, when the workpiece 3 to be cleaned has a higher precision requirement.

In another embodiment, the apparatus for cleaning the workpiece further comprises an oxidation protection device 16 for performing an oxidation protection on a surface of the workpiece 3 before heating, i.e., coating an oxidation film layer on the outer surface of the workpiece 3, and then putting the workpiece 3 into the heating device 1. The oxidation protection device 16 of the present disclosure is designed to avoid the oxidation of the surface of the workpiece that might be caused by heating the workpiece 3, when the workpiece 3 to be cleaned has a higher precision requirement.

The vacuum device 15 and the oxidation protection device 16 may be alternatively or both selected before the workpiece 3 is heated, which specifically depends on the workpiece 3 condition and is not limited herein.

According to one embodiment of the present disclosure, the apparatus for cleaning the workpiece further comprises a temperature control device 17 connected to the heating device 1 and capable of controlling the heating device 1 to heat the workpiece 3 to and maintain the preset temperature range. The temperature control device 17 is known in the prior art, and its specific structure is omitted herein. In one embodiment, as illustrated in FIG. 6, the temperature control device 17 for example may be resistance wires of corresponding specification disposed at different positions on the wall of the heating furnace 11, and a heating temperature of the heating furnace 11 is adjusted and maintained by controlling the temperature of the resistance wires.

According to one embodiment of the present disclosure, the heating device 1 and the temperature control device 17 are disposed separately from the cleaning device 2. The apparatus for cleaning the workpiece further comprises a transporting device 4 for transporting the heated workpiece 3 to the cleaning device 2 for cleaning.

Specifically, the transporting device 4 comprises a transporting slide rail 41 connected to the top of the outer frame 9 and located between the heating device 1 and the cleaning device 2, and a transporting tray 42 is movably connected to the transporting slide rail 41. The transporting slide rail 41 is a straight slide rail connected to a side of the outer frame 9 close to the cleaning device 2.

In this embodiment, the apparatus for cleaning the workpiece further comprises a thermal insulation wall 5 disposed along the transporting device 4, so as to maintain the temperature of the workpiece 3 in the transporting process and protect the operating personnel. The thermal insulation wall 5 is disposed along both sides of the outlet end of the heating furnace 11 in the heating device 1, and extends to the cleaning device 2. After being heated in the heating furnace 11, the workpiece 3 is carried out of the heating furnace 11 by the carrier vehicle 13. In that case, the transporting tray 42 moves to the carrier vehicle 13 to pick up and support the workpiece 3. Next, the transporting tray 42 slides on the transporting slide rail 41 to convey the workpiece 3 into the cleaning device 2 for cleaning.

According to one embodiment of the present disclosure, the cleaning device 2 comprises a water tank 21, a pumping device 22, a hydraulic tank 23 and a spray thrower 24. The pumping device 22 may be a hydraulic pump or a mechanical pump, having one end connected to the water tank 21, and the other end connected to the spray thrower 24. A cleaning solution is placed in the water tank 21. In the present disclosure, the cleaning solution is a water-based solution; further, the water-based solution is a corrosion-resistant and rust-resistant water-based organic solution. Alternatively, in another embodiment, the cleaning solution may be water. Alternatively, in other embodiment, a gas like nitrogen or argon in low temperature may be used as a medium for cleaning the workpiece. In which, the water-based organic solution is environmentally friendly and can be recycled or directly evacuated. The pumping device 22 can transfer the cleaning solution from the water tank 21 to the spray thrower 24. The hydraulic tank 23 is disposed in the outer frame 9 and located at one end of the thermal insulation wall 5 close to the cleaning device 2, for controlling and realizing various cleaning actions of the spray thrower 24.

Further more, the cleaning device 2 further comprises a filter 25 connected between the pumping device 22 and the spray thrower 24, for filtering the cleaning solution pumped into the spray thrower 24, so as to meet the cleaning requirement.

Figure 7:
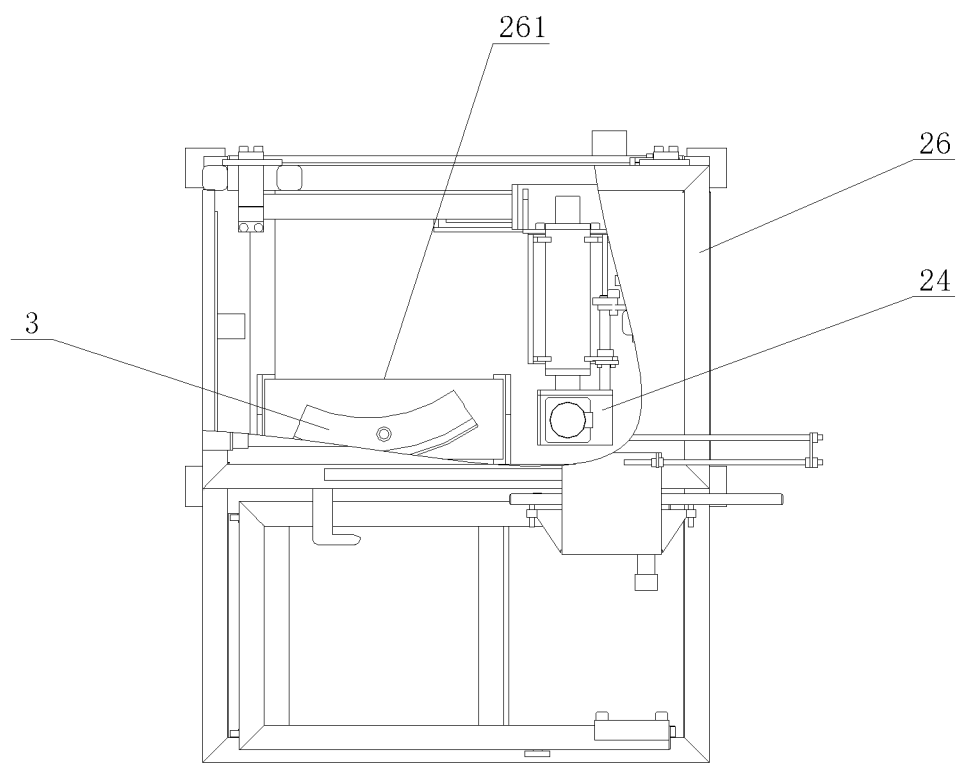
FIG. 7 is a structural diagram of a cleaning device of an apparatus for cleaning a workpiece in the present disclosure.

As illustrated in FIG. 7, the cleaning device 2 further comprises a cleaning chamber 26, into which the spray thrower 24 is movably connected. The cleaning chamber 26 is further provided therein with a tray 261 for placing the workpiece 3. After the workpiece 3 transported to cleaning device 2 by the transporting tray 42 of the transporting device 4 is put into the tray 261, the movement of the spray thrower 24 is controlled through the hydraulic tank 23, so that the spray thrower 24 is aligned with the workpiece 3 to spray the cleaning solution.

Figure 8:
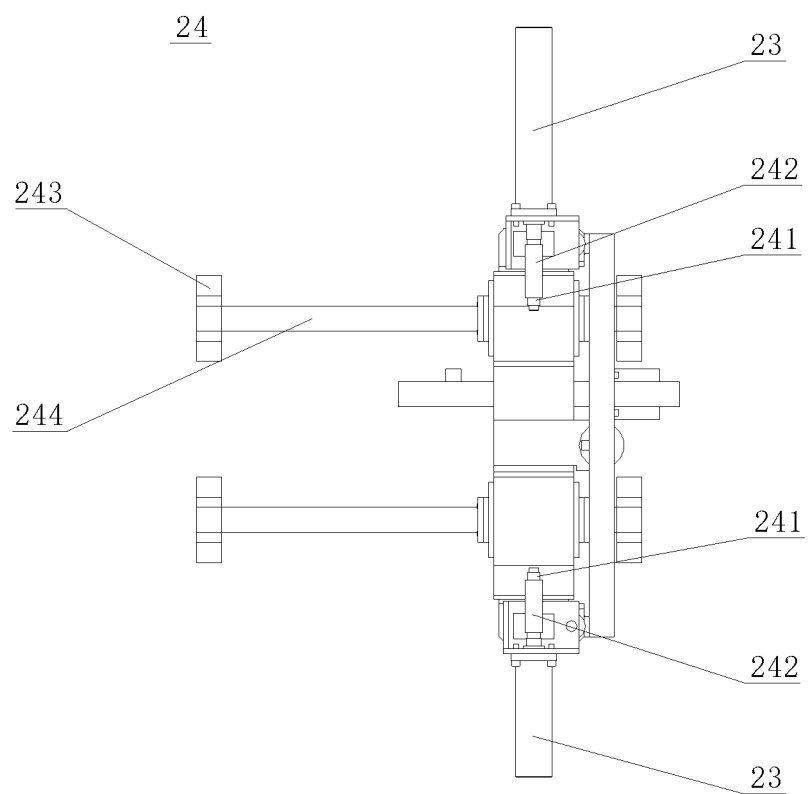
FIG. 8 is a structural diagram of a spray thrower in a cleaning device of an apparatus for cleaning a workpiece in the present disclosure.

As illustrated in FIG. 8, the spray thrower 24 comprises two sprayers 241 disposed as being opposite to each other, which are connected to a water pipe connector 242, respectively, and the water pipe connectors 242 are connected to the pumping device 22. In the present disclosure, the inner wall of the cleaning chamber 26 is fixedly connected with a fixing seat 243, and a guide rail 244 is connected to the fixing seat 243. Under the control of the hydraulic tank 23, the spray thrower 24 can be slidably disposed on the guide rail 244, so that the sprayer 241 is aligned with the workpiece 3 to be sprayed. In the present disclosure, the spraying has the meaning of injection, dripping leaching and/or scouring.

In one embodiment of the present disclosure, the workpiece 3 is a ventless tire segment mold 10, as illustrated in FIGS. 2 and 3. The ventless tire segment mold 10 comprises a plurality of inner passages 101, and a plurality of gaps 102 communicated with the inner passages 101 and communicated to an outer surface of the ventless tire segment mold 10; the inner passage 101 and the gap 102 both have small cross sectional areas, usually in micron scale and even in nano scale; when the ventless tire segment mold 10 is cleaned using the spray thrower 24, sprayers 241 of the spray thrower 24 are inserted into openings which are located at both ends of the ventless tire segment mold 10 and communicated with the inner passage 101; the cleaning solution is sprayed into the inner passage 101 and the gap 102 under a certain pressure; as liquid, the cleaning solution has strong fluidity, and can fill all of the inner passages 101 and gaps 102 in a very short time; under the effect of "micro-explosion" and the liquid scouring force, the dirt in the inner passages 101 and the gaps 102 of the ventless tire segment mold 10 can be cleaned; as a result, the dirt is peeled off the inner walls of the inner passages 101 and the gaps 102, and the workpiece becomes very clean. The ventless tire segment mold 10 is in an open or semi-open state during the cleaning, i.e., it has no sealed cavity, thereby avoiding any danger caused by the operation on the sealed cavity.

According to one embodiment of the present disclosure, the apparatus for cleaning the workpiece further comprises an electric cabinet 5 which is electrically connected to the heating device 1, the temperature control device and the pumping device 22, for transmitting electricity to the entire apparatus for cleaning the workpiece.

The apparatus for cleaning the workpiece of the present disclosure not only cleans the dirt on the surface of the workpiece, but also makes a significant breakthrough in the cleaning of the gaps of micron or nano scale on the workpiece. The present disclosure has the characteristics of lower cost, simple cleaning, thorough dirt removal, etc.

Embodiment 3

As illustrated in FIGS. 1 to 3, the present disclosure further provides a method for cleaning a ventless tire segment mold, wherein a water-based organic solution is injected into the inner passages 101 of the ventless tire segment mold 10 through upper and lower holes thereof; after vaporization, the water-based organic solution flows out of the gaps 102 of the ventless tire segment mold 10. It employs the method for cleaning the workpiece in Embodiment 1 to clean the ventless tire segment mold 10.

Embodiment 4

As illustrated in FIGS. 2 to 8, the present disclosure further provides an apparatus for cleaning a ventless tire segment mold 10, comprising the apparatus for cleaning the workpiece in Embodiment 2 to clean the ventless tire segment mold 10.

The above descriptions just demonstrate several embodiments of the present disclosure, and a person skilled in the art may make various changes or modifications to the embodiments of the present disclosure based on the disclosure of the application document, without deviating from the spirit and range of the present disclosure.

What is claimed is:

1. A method for cleaning a workpiece, comprising:
   heating the workpiece to a preset temperature, the preset temperature being 100° C. to 600° C., wherein the workpiece is a ventless tire segment mold, comprising a plurality of inner passages, and a plurality of gaps communicated with the inner passages, and cross sectional areas of the gaps are micron scale and nano scale, wherein the heating peels dirt off the inner walls of the inner passages and the gaps; and
   applying a cleaning solution onto the inner walls of the inner passages and the gaps of the workpiece so that the cleaning solution is vaporized instantaneously to form a micro-explosion at each shocking point, thereby peeling dirt off the inner walls of the inner passages and the gaps under an effect of micro-explosion and a liquid scouring force and achieving the purpose of workpiece cleaning.

2. The method for cleaning the workpiece according to claim 1, wherein the cleaning solution is applied onto the workpiece in a manner of spraying, and the cleaning solution is a water-based solution.

3. The method for cleaning the workpiece according to claim 1, wherein the preset temperature is 200° C. to 500° C.

4. The method for cleaning the workpiece according to claim 3, wherein the preset temperature is 300° C. or 350° C. or 400° C.

5. The method for cleaning the workpiece according to claim 1, wherein the cleaning solution is a water-based solution; or the cleaning solution is water.

6. The method for cleaning the workpiece according to claim 1, wherein if there is a cavity in the workpiece, the cleaning is made from the inside to the outside of the cavity, and the workpiece is in a non-sealed state.

7. The method for cleaning the workpiece according to claim 1, wherein the workpiece is put into a sealed structure firstly, and after the sealed structure is vacuum ized, the workpiece is heated.

8. The method for cleaning the workpiece according to claim 1, wherein an oxidation protection processing is performed on a surface of the workpiece before the heating.

9. The method for cleaning the workpiece according to claim 1, further comprising cleaning an outer surface of the workpiece by using dry ice or laser.

\* \* \* \* \*